United States Patent
Kubo et al.

[11] Patent Number: 5,884,440
[45] Date of Patent: Mar. 23, 1999

[54] SEISMIC ISOLATION DEVICE

[75] Inventors: Takaharu Kubo; Isao Hagiwara, both of Yokohama; Yoshihide Fukahori, Hachioji; Iki Harada, Yokosuka, all of Japan

[73] Assignee: Bridgestone Corporation, Tokyo, Japan

[21] Appl. No.: 21,845

[22] Filed: Feb. 11, 1998

Related U.S. Application Data

[62] Division of Ser. No. 722,567, Sep. 27, 1996, Pat. No. 5,765,322.

[30] Foreign Application Priority Data

| Sep. 29, 1995 | [JP] | Japan | 7-253831 |
| Dec. 8, 1995 | [JP] | Japan | 7-320076 |
| Dec. 27, 1995 | [JP] | Japan | 7-341314 |
| Dec. 27, 1995 | [JP] | Japan | 7-341316 |
| Jul. 22, 1996 | [JP] | Japan | 8-192526 |

[51] Int. Cl.⁶ .................................................. E04H 9/02
[52] U.S. Cl. ........................................ 52/167.7; 52/167.8
[58] Field of Search ................................. 52/167.1, 167.8

[56] References Cited

U.S. PATENT DOCUMENTS

| 4,593,502 | 6/1986 | Buckle. |
| 4,633,628 | 1/1987 | Mostaghel. |
| 4,830,927 | 5/1989 | Fukahori et al.. |
| 4,899,323 | 2/1990 | Fukahori et al.. |
| 5,014,474 | 5/1991 | Fyfe et al.. |
| 5,201,155 | 4/1993 | Shimoda et al.. |
| 5,233,800 | 8/1993 | Sasaki et al.. |
| 5,456,047 | 10/1995 | Dorka. |
| 5,490,356 | 2/1996 | Kemeny. |

FOREIGN PATENT DOCUMENTS

| 2-88834 | 3/1990 | Japan. |
| 2-248549 | 10/1990 | Japan. |
| 4-49384 | 2/1992 | Japan. |

*Primary Examiner*—Carl D. Friedman
*Assistant Examiner*—Phi Dieu Tran
*Attorney, Agent, or Firm*—Oliff & Berridge, PLC

[57] ABSTRACT

A seismic isolation apparatus which has a composite multilayered member comprising a plurality of hard plates having rigidity and a plurality of soft plates having viscoelastic property which are arranged to form alternating layers between an upper flange and a lower flange; and satisfies the condition that the proper vibration to the horizontal direction of the seismic isolation apparatus which is represented by $f_H$ and obtained by the equation $$f_H = \frac{1}{2P} \sqrt{K_H/M}$$

wherein $K_H$ represents a spring constant of the seismic isolation apparatus to the horizontal direction, M represents mass of a structure mounted on the seismic isolation apparatus, and $f_H$ has a value in the range of: $0.1 \text{ Hz} \leq f_H \leq 2$ Hz when the displacement of the seismic isolation apparatus in the horizontal direction is 2 mm or less, $0.1 \text{ Hz} \leq f_H \leq 0.8$ Hz when the displacement of the seismic isolation apparatus in the horizontal direction is equal to 100% shearing strain, and $0.9 \text{ Hz} \leq f_H$ when deformation in terms of shearing strain is relaxed by 10% from the maximum deformation in measurement of a hysteresis loop of the seismic isolation apparatus. The seismic isolation apparatus has the function of seismic isolation, prevention of shake by wind, and isolation of traffic vibration and is advantageously used for structures having a light weight, such as single family houses.

7 Claims, 16 Drawing Sheets

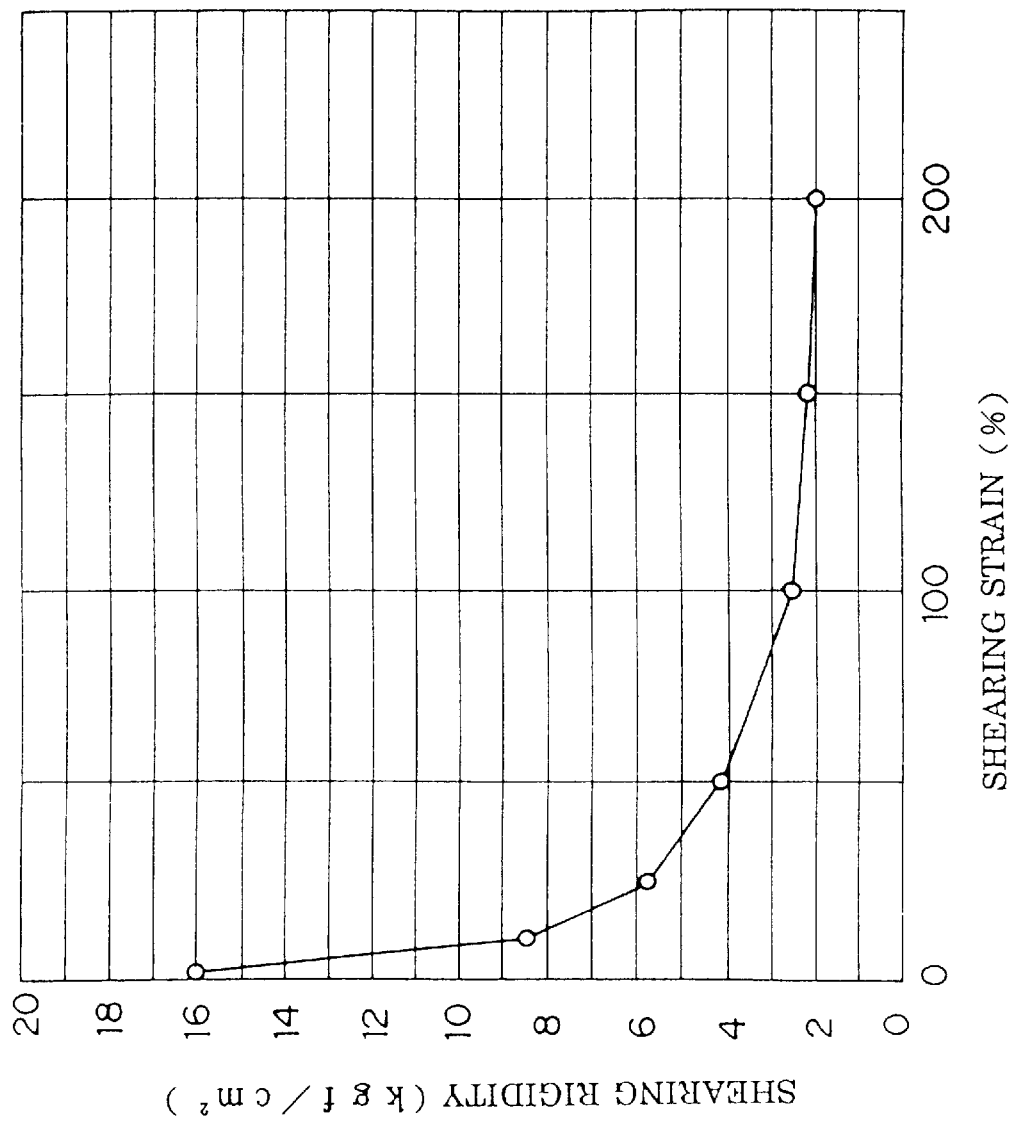

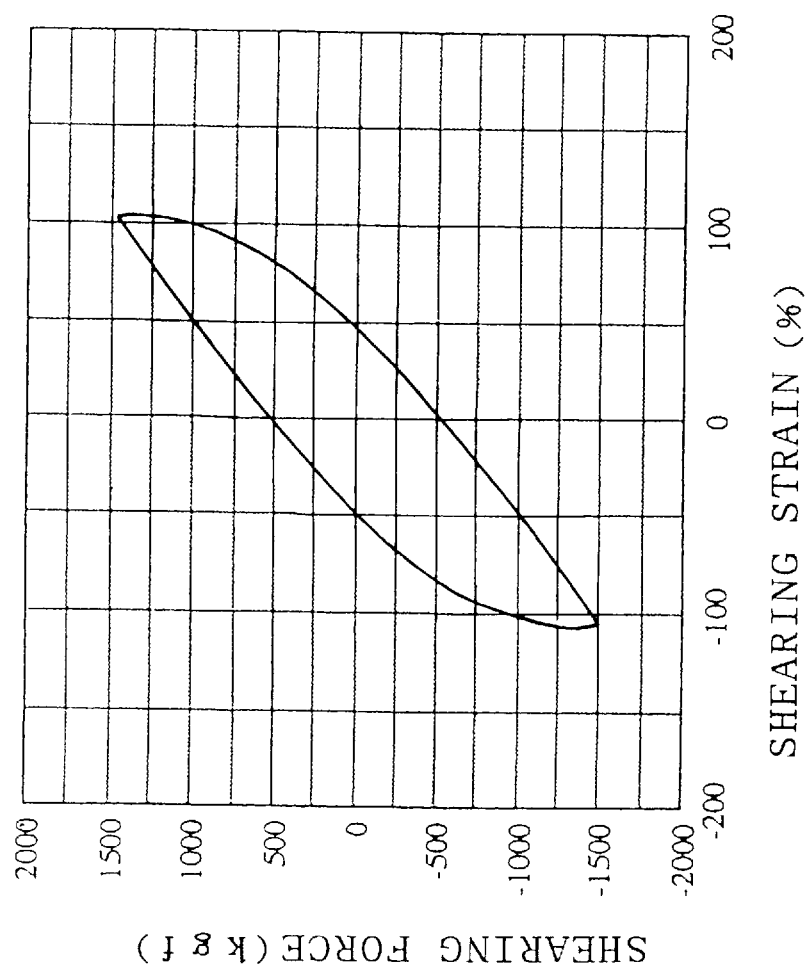

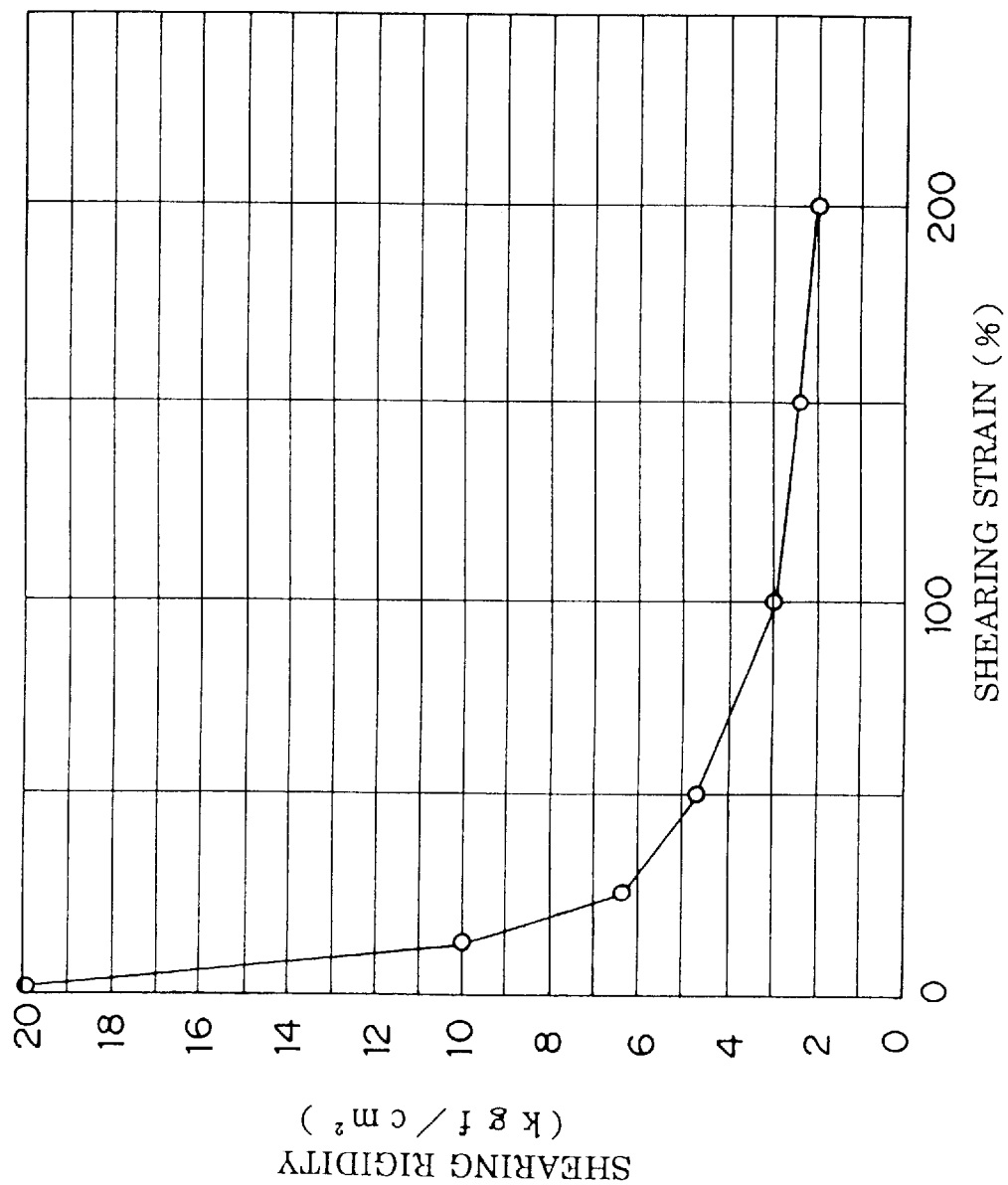

F I G. 1 6
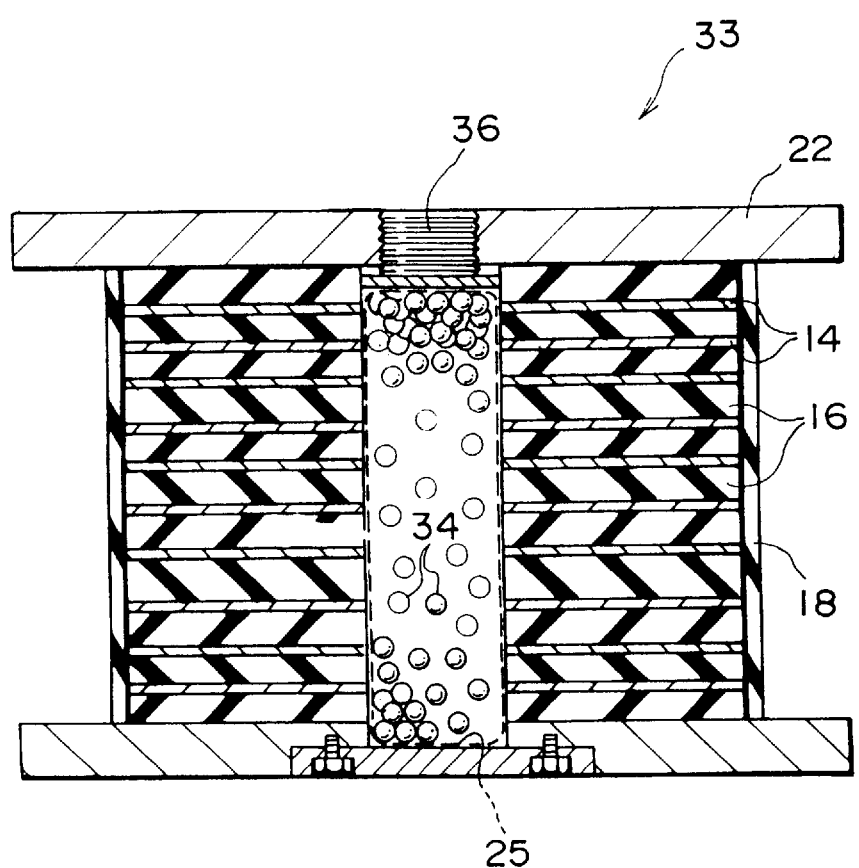

SEISMIC ISOLATION DEVICE

This is a Division of application Ser. No. 08/722,567 filed Sep. 27, 1996 now U.S. Pat. No. 5,765,322. The entire disclosure of the prior application is hereby incorporated by reference herein in its entirety.

BACKGROUND OF THE INVENTION

1. Field of the Invention

The present invention relates to a seismic isolation apparatus. More particularly, the present invention relates to a seismic isolation apparatus advantageously used for single family houses having a light weight.

2. Description of the Related Art

For protection of buildings from earthquake, seismic isolation apparatus in which a plurality of hard plates having rigidity such as steel plates and a plurality of soft plates having viscoelastic property such as rubber plates are arranged to form alternating layers have heretofore been used. It is generally practiced that, by shifting the proper vibration of a building to a lower value by supporting the building with the seismic isolation apparatus to avoid resonance of the building with the quake wave, the building is controlled to have a movement which is low in the frequency although large in the displacement, and that the vibration is damped in a short time by the combined use of a damper. As the damper used in combination with the seismic isolation apparatus, a damper of a rigid metal rod, a friction damper, and a viscous damper are used. A multilayer rubber having a lead plug confined into a composite multilayer structure and a high damping laminated rubber using a rubber having a high damping property are also used.

In recent years, seismic isolation of single family houses has been desired in addition to seismic isolation of heavy construction structures such as high rise buildings and bridges. However, when a conventional seismic isolation apparatus for heavy weight (for large buildings) is used as the seismic isolation apparatus for a single family house having a light weight, it is inevitable because of the light weight of the house that the seismic isolation apparatus has a small diameter and a large height in order to obtain the desired seismic isolating property. This shape is not suitable for practical use because buckling takes place very easily.

A rubber having a low elasticity which is suitable for supporting a light weight is necessary for obtaining the seismic isolation effect suitable for a structure having a light weight. However, when a rubber having a low elasticity is used, shake by wind arises because of the low elasticity. It is also strongly desired for a seismic isolation apparatus used for single family houses that the seismic isolation apparatus can isolate small vibrations (traffic vibration).

Thus, it has been desired that a seismic isolation apparatus for single family houses satisfies the following three requirements: (1) seismic isolation, (2) prevention of shake by wind, and (3) isolation of traffic vibration. No seismic isolation apparatus satisfying all these requirements is heretofore known.

SUMMARY OF THE INVENTION

Accordingly, the present invention has the object of providing a seismic isolation apparatus having the functions of seismic isolation, prevention of shake by wind, and isolation of traffic vibration and advantageously used for structures having a light weight, such as single family houses.

It was discovered that a seismic isolation apparatus effective for all of the earthquake, the shake by wind, and the traffic vibration can be obtained by setting the proper vibration of the seismic isolation apparatus in separate ranges of the input vibration.

Thus, the seismic isolation apparatus has a composite multilayered member comprising a plurality of hard plates having rigidity and a plurality of soft plates having viscoelastic property which are arranged to form alternating layers between an upper flange and a lower flange; and satisfies the condition that the proper vibration to the horizontal direction of the seismic isolation apparatus which is represented by $f_H$ and obtained by the following equation:

$$f_H = \frac{1}{2P} \sqrt{K_H/M}$$

wherein $K_H$ represents a spring constant of the seismic isolation apparatus to the horizontal direction, M represents mass of a structure mounted on the seismic isolation apparatus, and $f_H$ has a value in the range of:

0.1 Hz $\leq f_H \leq$ 2 Hz when the displacement of the seismic isolation apparatus in the horizontal direction is 2 mm or less, 0.1 Hz $\leq f_H \leq$ 0.8 Hz when the displacement of the seismic isolation apparatus in the horizontal direction is equal to 100% shearing strain, and 0.9 Hz $\leq f_H$ when deformation in terms of shearing strain is relaxed by 10% from the maximum deformation in measurement of a hysteresis loop of the seismic isolation apparatus.

In other words, the proper vibration at the shearing strain of 100% is set in the range of 0.1 Hz to 0.8 Hz for earthquake. The proper vibration at the return shearing strain by 10% from the maximum deformation of the hysteresis loop is set in the range of 0.9 Hz or more for the shake by wind. The proper vibration when the absolute value of the deformation of the seismic isolation apparatus is 2 mm or less is set in the range of 2 Hz or less and 0.1 Hz or more for the traffic vibration.

A seismic isolation apparatus effective for all of the vibrations can be obtained when the apparatus satisfies the above-described conditions.

As the method to achieve the proper vibration set in the above separate ranges, the following methods are advantageously used:

(1) In a composite multilayered member comprising a plurality of hard plates having rigidity and a plurality of soft plates having viscoelastic property which are arranged to form alternating layers between an upper flange and a lower flange, a cavity is formed through the composite multilayered member from the upper end to the lower end thereof, and a plurality of friction plates are laminated in the cavity.

(2) A cavity is formed through the composite multilayered member from the upper end to the lower end thereof, a metal, such as lead or tin, are confined in the cavity, and a laminate of protective plates is confined around the metal in the cavity for protection of the metal.

(3) A cavity is formed through the composite multilayered member from the upper end to the lower end thereof, and a granular material is confined in the cavity.

The seismic isolation apparatus of the present invention which achieves the proper vibration satisfying all the requirements described above by application of the above methods exhibits the seismic isolation property effective for all of the earthquake, the shake by wind, and the traffic vibration.

BRIEF DESCRIPTION OF THE DRAWINGS

FIG. 13 is a graph showing the relation between shearing rigidity and shearing strain of the seismic isolation apparatus of Example 4.

FIG. 14 is a graph showing a hysteresis loop of the seismic isolation apparatus of Example 5.

FIG. 15 is a graph showing the relation between shearing rigidity and shearing strain of the seismic isolation apparatus of Example 5.

FIG. 16 shows a schematic sectional view of the seismic isolation apparatus of Example 6.

DESCRIPTION OF THE PREFERRED EMBODIMENT

Figure 1:
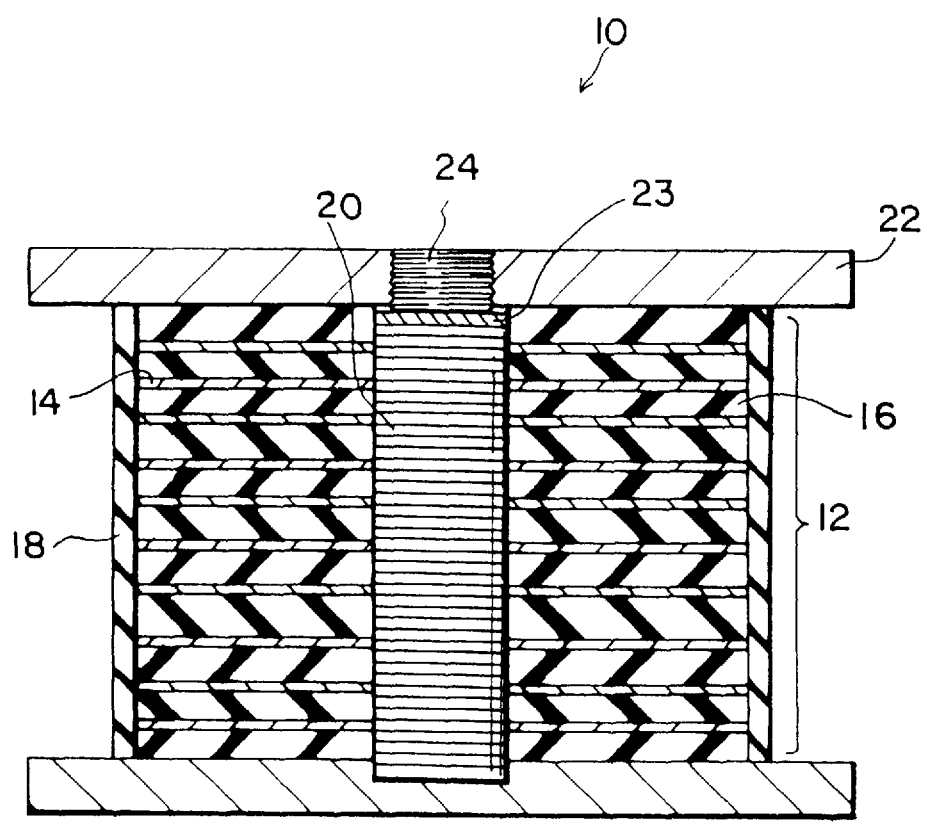
FIG. 1 shows a schematic sectional view of the seismic isolation apparatus of Example 1.

The conditions required for the seismic isolation apparatus of the present invention, such as the proper vibration, are described in the following.

It is known with the traffic vibration that a strong vibration exists in the frequency range of more than 2 Hz and 5 Hz or less. For isolation of the traffic vibration, the proper vibration of the seismic isolation apparatus under the displacement of the seismic isolation apparatus of 2 mm or less in the horizontal direction is preferably adjusted within the range of 0.1 Hz or more and 2 Hz or less, more preferably within the range of 0.3 Hz or more and 1.5 Hz or less, most preferably within the range of 0.5 Hz or more and 1 Hz or less.

When the proper vibration of the seismic isolation apparatus represented by $f_H$ is more than 2 Hz, the apparatus resonates with the traffic vibration, and the effect of isolation of the vibration is not obtained. When the seismic isolation apparatus is designed in such a manner that the proper vibration is less than 0.1 Hz, the total thickness of the soft plates in the composite multilayered member is increased, and the composite multilayered member becomes thick and tall. This composite multilayered member cannot practically be used because it has an unstable shape and shows a large creep.

For exhibiting seismic isolation effect at the time of earthquake, the seismic isolation apparatus is designed in such a manner that the proper vibration of the seismic isolation apparatus represented by $f_H$ at 100% shearing strain is adjusted within the range of 0.1 Hz or more and less than 0.8 Hz, preferably within the range of 0.2 Hz or more and less than 0.8 Hz, more preferably within the range of 0.3 Hz or more and less than 0.8 Hz. When the seismic isolation apparatus has a proper vibration of more than 0.8 Hz, the seismic isolation apparatus resonates with the seismic wave, and the seismic isolation effect cannot be obtained. When the seismic isolation apparatus has a proper vibration of less than 0.1 Hz, the rigidity of spring must be decreased by making the soft plates in the composite multilayered member an extremely low elastic or by increasing the total thickness of the soft plates in the composite multilayered member. When the total thickness of the soft plates is increased, the thickness of the composite multilayered member is excessively increased to make the composite multilayered member tall. This composite multilayered member cannot practically be used because of the unstable shape. When the soft plate in the composite multilayered member has an extremely low elasticity, the composite multilayered member cannot practically be used because of increase in creep.

For prevention of the shake by wind, a seismic isolation apparatus is designed in accordance with the following consideration. The wave of wind is a composite wave of low frequency waves and high frequency waves. The high frequency waves are the cause of unpleasant feeling to residents. When a building equipped with a seismic isolation apparatus is exposed to wind, the building which is swayed to a metastable position in the horizontal direction from the original position by the pressure generated by the wind speed, is shaken by the high frequency components of the wind at the metastable position. The shake by the high frequency components is the cause of unpleasant feeling to residents. Therefore, when the seismic isolation apparatus has a high rigidity at the return of the hysteresis loop, the residents feel shake of the same degree as that felt by residents in a building not equipped with a seismic isolation apparatus.

The seismic isolation apparatus is preferably designed in such a manner that the proper vibration at the return of the hysteresis loop, more specifically the proper vibration when deformation in terms of shearing strain is relaxed by 10% from the maximum deformation in measurement of a hysteresis loop of the seismic isolation apparatus, is 0.9 Hz or more, preferably 1 Hz or more, more preferably 1.1 Hz or more. When a seismic isolation apparatus is designed in such a manner that the proper vibration at the return of the hysteresis loop is less than 0.9 Hz, the effect of preventing the shake cannot be obtained because the movement at the return is increased, and residents feel a large degree of shake by wind.

The components used in the seismic isolation apparatus of the present invention in order to satisfy the above requirements are described in detail hereinafter.

The composite multilayered member as a component of the seismic isolation apparatus of the present invention is described in the following. The material used for the soft plate having viscoelastic property comprised in the composite multilayered member is a material having viscoelastic property and 50% modulus in the range of 1 to 10 kgf/cm$^2$, preferably 1 to 5 kgf/cm$^2$, more preferably 1.5 to 4 kgf/cm$^2$. The 50% modulus of such a material can be measured, for example, by a method in accordance with Japanese Industrial Standard K6301, or K6394.

As the material having viscoelastic property, materials selected from organic materials, such as thermoplastic rubbers, urethane rubbers, various types of vulcanized rubber, various types of unvulcanized rubber, various types of slightly vulcanized rubber, and plastics; foamed materials obtained from these organic materials; inorganic materials, such as asphalt and clay; and mixed materials obtained from these materials and having viscoelastic property can be used.

The above material is made into a flat plate by molding and used as the soft plate. The shape of the soft plate is not particularly limited. However, it is necessary that the soft plate have a cavity at the center thereof because a cylindrical cavity must be present in the composite multilayered member in the seismic isolation apparatus of the present invention. In general, the composite multilayered member which has a so-called pillar shape with a cavity at the center thereof is used, and each individual soft plate has a shape of a doughnut plate. However, the overall shape is not limited to a round shape, and other shapes, such as a square shape, may also be used as long as a cavity is present at the center. The thickness of the soft plate is not particularly limited, and can suitably be selected in accordance with the used materials and the desired seismic isolation property. A soft plate having a thickness of about 1 to 4 mm is generally used.

The above material of the soft plate may be used singly or as a mixture of two or more types. The whole plate may be formed with a single type of the material, or with a combination of two or more types of the material, such as a combination of a material having a large damping at an inner part and a soft material having good creep property at an outer part.

As the hard plate used in the present invention, various types of material having a required rigidity, such as metals, ceramics, plastics, fiber reinforced plastics, polyurethane, woods, paper plates, slate plates, and decorated plates, can be used. The required rigidity means a rigidity which can suppress occurrence of buckling in the shearing deformation, and the required rigidity is varied depending on the condition of design.

The thickness and the shape of the hard plate is not particularly limited, and can be selected suitably in accordance with the used materials and the desired seismic isolation property. A hard plate having a thickness of about 0.5 to 5 mm is generally used. In the same manner as the shape of the soft plate, the shape of the hard plate can be selected as desired as long as the hard plate has a cavity at the center thereof. In general, the same shape as that of the soft plate used in combination is used.

The composite multilayered member is constituted with the above soft plates and the above hard plates which are alternately arranged to form a plurality of alternating layers. The type, the shape, the area, and the thickness of the soft plate and the hard plate vary depending on the required seismic isolation property as described above. A cavity in which various means of improving the seismic isolation property of the composite multilayered member are disposed must be formed at the inside of the composite multilayered member. Therefore, the soft plates and the hard plates both having the same doughnut plate shape and the same surface area or the same square plate shape having a cavity therein and the same surface area are generally used.

The outside of the seismic isolation apparatus of the present invention may be covered with a material having good weathering resistance in order to provide good weathering resistance to the seismic isolation apparatus. As the cover material, butyl rubber, acrylic rubber, polyurethane, silicone rubber, fluororubber, polysulfide rubber, ethylene-propylene rubbers (EPR and EPDM), chlorosulfonated polyethylene, chlorinated polyethylene, ethylene-vinyl acetate rubber, chloroprene rubber, a thermoplastic rubber, such as hypalon, chlorinated polyethylene, and ethylene-vinyl acetate rubber, and a resin can be used. The cover material may be used singly or as a blend of two or more types. The above materials may also be used as a blend with natural rubber, isoprene rubber, butadiene rubber, styrene-butadiene rubber, or nitrile rubber.

The seismic isolation apparatus of the present invention is advantageously used under a pressure per unit area of 5 kgf/cm$^2$ or more and 150 kgf/cm$^2$ or less, preferably 5 kgf/cm$^2$ or more and 50 kgf/cm$^2$ or less, more preferably 5 kgf/cm$^2$ or more and 30 kgf/cm$^2$ or less.

FIG. 1 shows a schematic sectional view of a seismic isolation apparatus 10 of the present invention. A composite multilayered member 12 constituted with hard plates 14 and soft plates 16 has a cavity at the center. Friction plates 20 are confined into the cavity in the form of a laminate. The composite multilayer member 12 is covered with a cover rubber 18. A holding plate 23 is disposed on the laminate of the friction plates 20. A tap bolt, as the upper cap 24, having a hexagonal socket head with an external thread is disposed at the center of a flange 22. Confining pressure is applied to the laminate of the friction plates 20 by screwing the upper cap 24.

The friction plate used in the seismic isolation apparatus of the present invention is described in detail in the following.

The material for the friction plate used in the present invention is not particularly limited, and various materials, such as macromolecular materials, metals, ceramics, and inorganic materials, can be used. As the macromolecular material, for example, thermoplastics, such as polyamides (nylon), polyethylene, polypropylene, polystyrene, polystyrene reinforced with glass fiber, poly-p-xylene, polyvinyl acetate, polyacrylates, polymethacrylates, polyvinyl chloride, polyvinylidene chloride, fluoroplastics, polyacrylonitrile, polyvinyl ethers, polyvinyl ketones, polyethers, polycarbonates, thermoplastic polyesters, diene plastics, polyurethane plastics, aromatic polyamides, polyphenylenes, and silicones, can be used. Among these materials, nylon, polyethylene, polyesters, polypropylene, polyvinyl chloride, and thermosetting plastics are preferable in view of the properties and availability of the material. Fiber reinforced plastics composed of a matrix, such as the thermoplastics and the thermosetting plastics described above and a reinforcing fiber, such as glass fiber, carbon fiber, and a metal fiber (for example, fiber reinforced plastics based on an unsaturated polyester), macromolecular compounds filled with inorganic substances, and metals coated with a ceramic or a macromolecular compound on the surface thereof may also be used. These materials may be used singly or as a composite of a plurality of types. Plasticizers and fillers may be added to these materials. These materials may also be used by mixing reinforcing materials in the same manner as the fiber reinforced plastics.

The shape of the laminate of the friction plates used in the present invention is not particularly limited, and may be a cylinder, a triangle pole, a square pole, or another polygonal pole. The size of the laminate of the friction plates in terms of the cross-sectional area of the laminate is 1.0% or more and 64% or less, preferably 1% or more and 20% or less, more preferably 1% or more and 10% or less, most preferably 2% or more and 5% or less, of the sectional area of the composite multi layered member. When the cross-sectional area of the laminate comprising the friction plates is more than 64% of the sectional area of the composite multilayered member, drawbacks arise in (1) that bucking takes place more easily, (2) that the shear modules at the shearing strain of 100% becomes larger than that of the composite multi-layered member having no laminate of friction plates, and the desired seismic isolation effect cannot be obtained, and (3) that breakage resistance properties deteriorate. When the cross-sectional area is less than 1.0%, the damping effect is not exhibited, and the object of the present invention cannot be achieved.

When the thickness of the friction plate is represented by $t_{friction}$ and the thickness of a single sheet of the soft plate is represented by tR, $t_{friction}$ is preferably smaller than $t_R$ ($t_{friction} \leq t_R$). The diameter of the friction plate represented by d, the height of the composite multilayered member represented by H, and the total thickness of the soft plates represented by h preferably have a relation expressed by the following equation:

$$d \geq 10(h/H) t_{friction}.$$

The above relation is described in more detail in the following. When the thickness of a single sheet of the hard plate is represented by $t_s$ and the number of the hard plate is represented by n, the following equations can be written:

$$H=(n+1)t_R+nt_s$$

$$h=(n+1)t_R$$

When the number of the friction plates disposed between the upper and lower flanges is represented by m, H is related to m and $t_{friction}$ by the following equation:

$$H=mt_{friction}$$

The area of the overlapping part of the friction plates at the shearing strain of 200% is preferably 80% or more of the diameter d of the friction plate. Therefore, d has the relations expressed by the following equations:

$$2h/m \leq d/5$$

$$d \geq 10(h/m)=10(h/H)t_{friction}$$

The area of the overlapping part of the friction plates at the shearing strain of 200% is more preferably 90% or more of the diameter d of the friction plate. Therefore, more preferably, d has the relation expressed by the following relation:

$$d \geq 20(h/H)t_{friction}$$

When the diameter of the hard plate is represented by D, the ratio of d to D is preferably in the following range:

$$0.1 \leq (d/D) \leq 0.8$$

more preferably in the following range:

$$0.1 \leq (d/D) \leq 0.6$$

When d/D is more than 0.8, the friction force is excessively large, and the balance between the rigidity of spring and the friction force of the seismic isolation apparatus is adversely affected to deteriorate the restoring ability. When d/D is less than 0.1, the desired damping effect is not obtained, and the object of the present invention cannot be achieved.

The pressure used for confining the friction plates into the cavity is 5 $kgf/cm^2$ or more and 150 $kgf/cm^2$ or less, preferably 5 $kgf/cm^2$ or more and 100 $kgf/cm^2$ or less, more preferably 10 $kgf/cm^2$ or more and 60 $kgf/cm^2$ or less.

When the pressure is less than 5 $kgf/cm^2$, the force for confining the friction plates is insufficient and sufficient friction force cannot be obtained. Thus, it is difficult to obtain a sufficient damping property cannot be obtained. When the pressure at the surface is more than 150 $kgf/cm^2$, an abnormal deformation arises such that the part of the friction plates only at the center is pressed while the peripheral parts are stretched to the vertical direction, and there is the possibility that the seismic isolation property is affected. Therefore, 150 $kgf/cm^2$ is practically the upper limit of the pressure.

The force for pressing (the force for confining) the friction plates into the cavity can be controlled by adjusting the screwing torque of the screw of a cap having thread and disposed on top of the friction plates. In other words, the upper flange is internally threaded, and a cap with the screw having an external thread to fit therein is attached. The force for confining the friction plates is adjusted to a specific value by adjusting the screwing torque of the screw to a specified value. As for the size of the screw, it is preferred that the diameter of the screw is the same as or smaller than the diameter of the friction plates.

Figure 2:
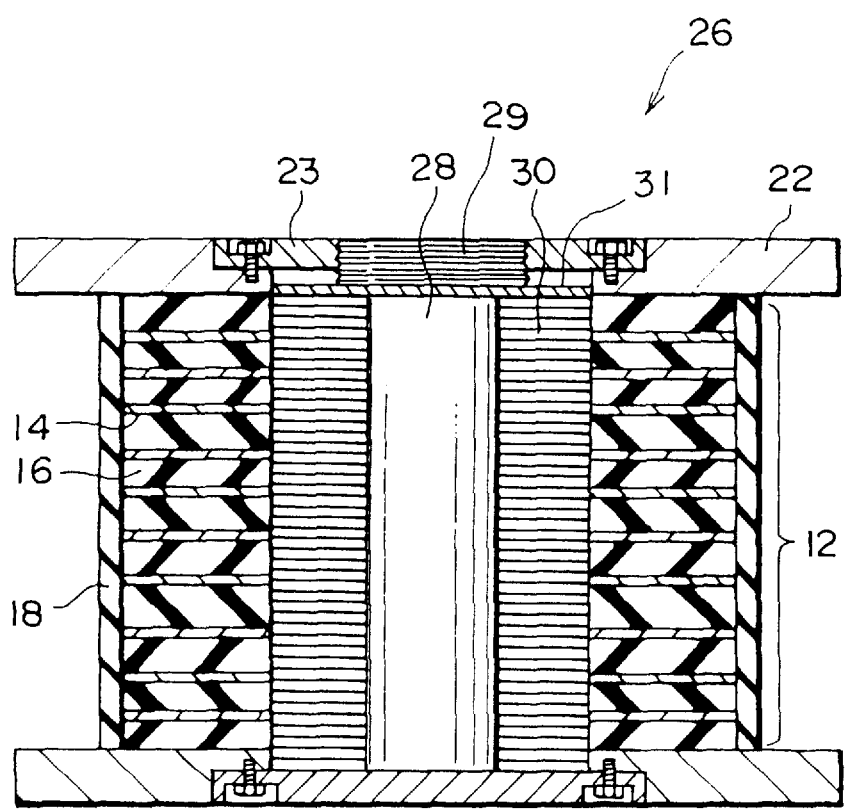
FIG. 2 shows a schematic sectional view of the seismic isolation apparatus of Example 4.

FIG. 2 shows a sectional view of a seismic isolation apparatus 26 in which a plastic material 28 having a pillar shape is placed in the cavity at the center of a composite multilayered member 12 comprising hard plates 14 and soft plates 16, and protective rings 30 are arranged to form a multilayer structure around the lead. For the plastic material 28 having a pillar shape, a metal, such as lead and tin, or a macromolecular material which is subject to plastic deformation is used. Lead is preferable among these materials. The material for the protective ring 30 which is arranged around the plastic material 28 having a pillar shape to prevent damage on the plastic material is selected from the group consisting of metals, ceramics, macromolecular compounds, macromolecular compounds reinforced with reinforcing fibers selected from the group consisting of glass fiber, carbon fiber, and metal fibers, and metal plates coated with a ceramic or a macromolecular compound on the surface thereof. It is particularly preferred that the protective ring is formed with a material which has a lower elasticity than the plastic material and, at the same time, can firmly hold the plastic material. Examples of such a material include thermoplastics, such as polyamides, polyethylene, polypropylene, polystyrene, and silicone, fiber reinforced plastics using these thermoplastics as the matrix, macromolecular compounds filled with inorganic substances, and metals coated with a ceramic or a macromolecular compound on the surface thereof. The above materials may be used singly or as a combination of two or more types.

When the size of the metal, such as lead and tin, used as the plastic material having a pillar shape in the composite multilayered member of the present invention is expressed by the cross-sectional area of the plastic material having a pillar shape relative to the cross-sectional area of the composite multilayered member, the size of the metal is 0.04% or more and 25% or less, preferably 0.16% or more and 9% or less, more preferably 0.3% or more and 4% or less, based on the sectional area of the composite multilayered member The size of the laminate of a metal, such as lead and tin, around which a protective ring is arranged is in the range of $0.1 \leq (D_{out}/D) \leq 0.8$, preferably in the range of $0.1 \leq (D_{out}/D) \leq 0.5$, more preferably in the range of $0.1 \leq (D_{out}/D) \leq 0.3$.

When earthquake takes place, the protective ring moves in accordance with shear deformation of the seismic isolation apparatus and cuts into the plastic material, such as lead, having a pillar shape. When the distance of the protection ring cutting into the plastic material is 25% or more of the diameter $D_L$ of the plastic material having a pillar shape, the plastic material having a pillar shape is cut off to separate pieces. Therefore, the distance of the protective ring cutting into the plastic material having a pillar shape is preferably 15% or less, more preferably 10% or less, of the diameter $D_L$ of the plastic material having a pillar shape. It is preferred that the diameter of the protective ring is determined in such a manner that the above distance of the thrust is kept within the above specified range.

Slippage of the soft plates is caused by earthquake which gives rise to a shearing strain of 200%. The distance of the slippage of the soft plates is 2 h wherein the total thickness of the soft plates is represented by h because the deformed part is the soft plates. The distance of the slippage of a single protective ring is 2 h/k wherein k represents the number of the protective ring in the multilayer structure and H represents the height of the composite multilayered member. It is preferred that the value of 2 h/k is 25% or less of the diameter $D_L$ of the plastic material having a pillar shape, i.e.:

$$(2h/k) \leq 0.25 D_L$$

Since H is expressed by the following equation:

$$H = k\, t_{ring},$$

the above equation is converted to the following equation:

$$[2h/(H/t_{ring})] \leq 0.25 D_L$$

Therefore, the thickness of the protective ring is in the following range:

$$t_{ring} \leq 0.25\, D_L H/2h$$

preferably in the following range:

$$t_{ring} \leq 0.15\, D_L H/2h$$

more preferably in the following range:

$$t_{ring} \leq 0.10\, D_L H/2h$$

The width of the protective ring $[(D_{out}-D_{in})/2$ wherein $D_{out}$ represents the outer diameter and $D_{in}$ represents the inner diameter] must be adjusted in such a manner that the protective rings which are adjacent to each other always have an overlapping part even under a deformed condition of the seismic isolation apparatus by shearing. When this condition is considered, the width of the protective ring is in the following range:

$$(D_{out}-D_{in})/2t_{ring} \geq 2$$

preferably in the following range:

$$(D_{out}-D_{in})/2t_{ring} \geq 3$$

more preferably in the following range:

$$(D_{out}-D_{in})/2t_{ring} \geq 7$$

The pressure used for confining the plastic material and the protective ring into the cavity is 5 kgf/cm² or more and 150 kgf/cm² or less, preferably 5 kgf/cm² or more and 100 kgf/cm² or less, more preferably 10 kgf/cm² or more and 60 kgf/cm² or less.

When the pressure is less than 5 kgf/cm², the force for confining the protective rings is insufficient. Therefore, the shearing deformation of the plastic material, such as lead, does not normally take place, and it is difficult to obtain a sufficient damping property. When the pressure is more than 150 kgf/cm², an abnormal deformation arises such that the part of the protective rings only at the center is pressed while the peripheral parts are stretched to the vertical direction, and there is the possibility that the seismic isolation property is affected. Therefore, 150 kgf/cm² is practically the upper limit of the pressure.

The force for pressing (the force for confining) the plastic material for friction and the laminate of protective rings into the cavity can be controlled by adjusting the screwing torque of a screw of a cap having an external thread which is disposed on top of the plastic material and the laminate of protective rings. In other words, the upper flange is internally threaded, and a cap having an external thread is fitted therein. The force for confining the plastic material and the laminate of the friction rings is adjusted to a specific value by adjusting the screwing torque of the screw to a specified value. As for the size of the screw, it is preferred that the diameter of the screw is the same as or smaller than the diameter of the laminate of the friction plates.

As described in the above, a combination of a high elasticity at a low strain, a low elasticity at a high strain, and a high damping can be exhibited when a plastic material 28 such as lead and protective rings 30 are arranged in the whole part of the cavity in the composite multilayered member 26, and an excellent effect is exhibited for seismic isolation and prevention of shake by wind.

Figure 3:
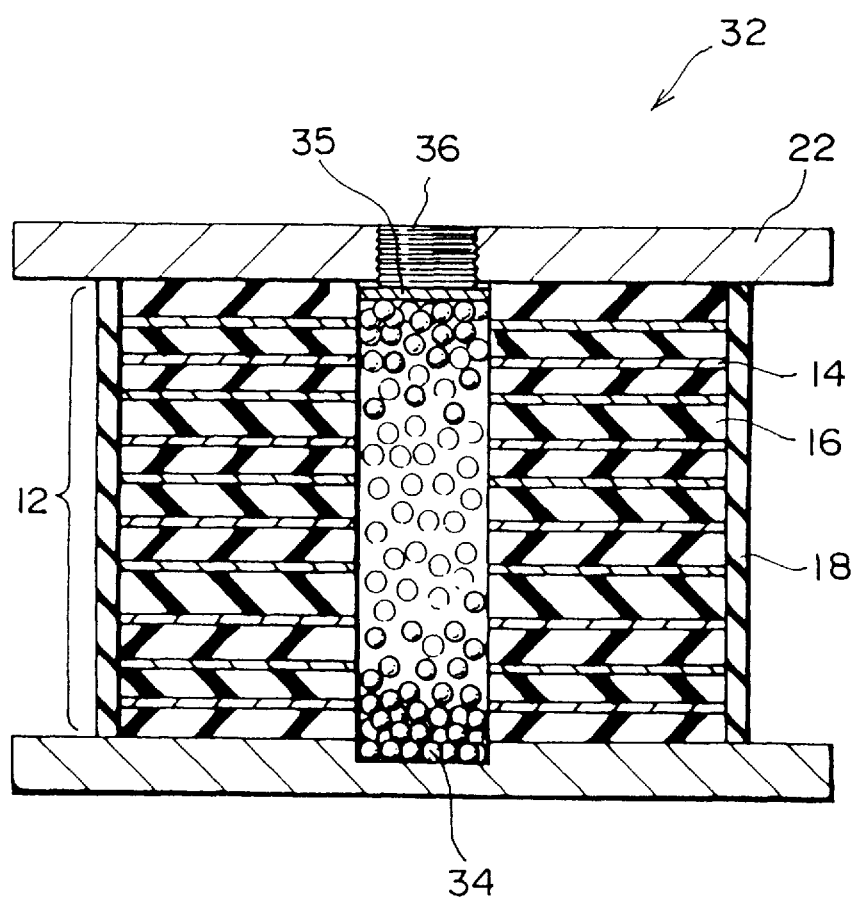
FIG. 3 shows a schematic sectional view of the seismic isolation apparatus of Example 5.

FIG. 3 shows a cross-sectional view of a seismic isolation apparatus 32 in which a granular material 34 is packed into a cavity in a composite multilayered member 12. The seismic isolation apparatus 32 has the following construction. Into the cavity disposed at the center of the composite multilayer member 12 constituted with hard plates 14 and soft plates 16, glass beads (a spherical shape) 34 as the hard granular material are packed with tapping. The glass beads 34 are packed in a compressed condition by imparting a compression force of a cap 36 with a thread placed on top of the glass beads 34 to the glass beads 34 to confine the beads 34 into the cavity in a compressed state. The peripheral surface of the composite multilayered member is covered with a cover rubber 18 made of a natural rubber material.

The hard granular material which is packed into the cavity having a pillar shape at the center of the seismic isolation apparatus is not particularly limited so long as the material can prevent an excessive deformation of the seismic isolation apparatus by friction between grains of the material which have been confined into the cavity with pressure. Examples of the preferable material include granular materials prepared by using copper, iron, sand for sand blasting, glass, quartz, plastics, other natural materials, and industrial waste materials. Fiber reinforced plastic having a sufficient hardness and various types of ceramic may also be used.

The size of the grain is preferably in the range of 0.01 to 30 mm. When the size of the grain is smaller than 0.01 mm, a sufficient force cannot be applied for packing the material into the cavity. When the size of the grain is larger than 30 mm, the contact areas among the grains are decreased. The desired friction force is hardly obtained in either case, and a size outside of the specified range is not preferable.

Specific examples of the hard granular material include glass beads, metal spheres, such as iron spheres and copper spheres, sand, quartz powder, and sand for sand blasting containing $Al_2O_3$ as the main component.

The shape of the granular material is not particularly limited as long as the grain has the size described above. The shape may be any of a spherical shape, a spindle shape, and amorphous shapes. The surface of the grain may be smooth or may have fine roughness. In view of the effect of relaxing deformation and exhibiting the friction force, a shape close to a sphere having an aspect ration of 3 or less is preferred to a flat plate shape.

When the hard granular material is packed into the cavity in the seismic isolation apparatus described above, it is preferable that the granular material is loaded in the closest parking by tapping or by the like method, and further confined into the cavity by imposing stress on the material by using a cap or the like. The friction force among the hard grains packed in the closest parking in the cavity contributes to the damping. Therefore, a packing condition in which the hard grains can have a space to vibrate freely from each other is not preferable because the desired damping effect cannot be obtained.

The pressure used for confining the granular material is 5 $kgf/cm^2$ or more and 150 $kgf/cm^2$ or less, preferably 5 $kgf/cm^2$ or more and 100 $kgf/cm^2$ or less, more preferably 10 $kgf/cm^2$ or more and 60 $kgf/cm^2$ or less.

When the pressure is less than 5 $kgf/cm^2$, the force for confining the granular material is insufficient, and it is difficult to obtain a sufficient damping property. When the pressure is more than 150 $kgf/cm^2$, an abnormal deformation arises such that the part packed with the granular material only at the center is pressed while the peripheral parts are stretched to the vertical direction, and there is the possibility that the seismic isolation property is affected. Therefore, 150 $kgf/cm^2$ is practically the upper limit of the pressure.

The force for pressing (the force for confining) the granular material into the cavity can be controlled by adjusting the screwing torque of a cap having a thread and disposed on the top of a pressing plate used for pressing the granular material. In other words, the upper flange is internally threaded, and a cap having an external thread for fitting therein is attached. The force for confining the granular material is adjusted to a specific value by adjusting the screwing torque of the screw to a specified value. As for the size of the screw, it is preferred that the diameter of the screw is the same as or smaller than the diameter of the pressing plate used for pressing the granular material.

In the seismic isolation apparatus of the present invention, it is preferred that the above granular material is disposed in a bag made of a fiber sheet, a vulcanized rubber sheet, a thermoplastic rubber sheet, or a thermoplastic resin sheet which is disposed in the cavity having a pillar shape. The bag is used for containing and holding the above hard granular material and is required to be flexible and to have a good property to follow a shape and a sufficient strength.

The fiber sheet constituting the bag is not particularly limited, and a woven fabric, a knitted fabric, a sheet in the form of a net, or a non-woven fabric may be used as long as the fiber sheet has the above property. As the material fiber used for the sheet, a fiber material can be selected as desired from natural fibers, such as cotton and linen; regenerated fibers, such as viscose rayon; synthetic fibers, such as polyesters, polyamides, and acrylic fibers; inorganic fibers, such as carbon fiber, and metal fibers, such as stainless steel fibers. Among these sheets and fiber materials, woven fabrics and knitted fabrics made of fibers of cotton, polyesters, and polyamides and non-woven fabrics made of fibers of polyester and polypropylene are preferable in view of the strength and the durability.

The shape of the bag is not particularly limited because the bag is formed with a thin sheet of a fiber and has a good property to follow a shape. It is preferred for holding the hard granular material that the bag is formed to a shape fitting to the shape of the cavity formed in the above composite multilayered member by a conventional method, such as sewing or adhesion by heating.

Exhibition of a higher friction force can be enabled because movement of the granular material disposed in the cavity into the soft plates composed of a soft rubber can be prevented by the bag.

As the method of arranging the hard granular material packed in a bag, a bag may be arranged in the cavity, and then the hard granular material may be packed into the bag. However, the preparation is made simpler by packing the hard granular material into a bag in advance, followed by inserting the packed bag into the cavity.

The present invention is described specifically with reference to examples in the following. However, the present invention is not limited by the examples.

EXAMPLE 1

FIG. 1 shows a sectional view of the seismic isolation apparatus 10 of Example 1 of the present invention.

A composite multilayered member 12 was constituted with 30 sheets of a hard plate 14 (an inner steel plate) (outer diameter, 250 mmø; inner diameter, 35 mmø; and thickness, 1.6 mm) and 31 sheets of a soft plate 16 (a rubber having a 50% modulus of 2.7 $kgf/cm^2$, a tensile strength of 90 $kgf/cm^2$, and an elongation at break of 760% being used; thickness, 2.5 mm) (the total thickness of the rubber, 78 mm). Into the cavity of the composite multilayered member 12, a laminate of 97 sheets of nylon plates (6,6-nylon) having an outer diameter of 35 mmø and a thickness of 1.5 mm as the friction plates 20 was stacked. The peripheral surface of the composite multilayered member 12 was covered with a cover rubber 18 made of a rubber having excellent weatherability.

The center of a fixing flange 22 disposed at one side of the composite multilayered member 12 was threaded in M30. A steel plate 23 having an outer diameter of 35 mm and a thickness of 5 mm was disposed on top of the laminate of the friction plates 20. The laminate of the friction plates 20 was pressed with a bolt (a cap) 24 of M30 through the fixing flange threaded in M30 with a clamping torque of 200 kgf-cm to confine the laminate of the friction plates 20 in the cavity. The clamping pressure force was 50 $kgf/cm^2$.

Figure 4:
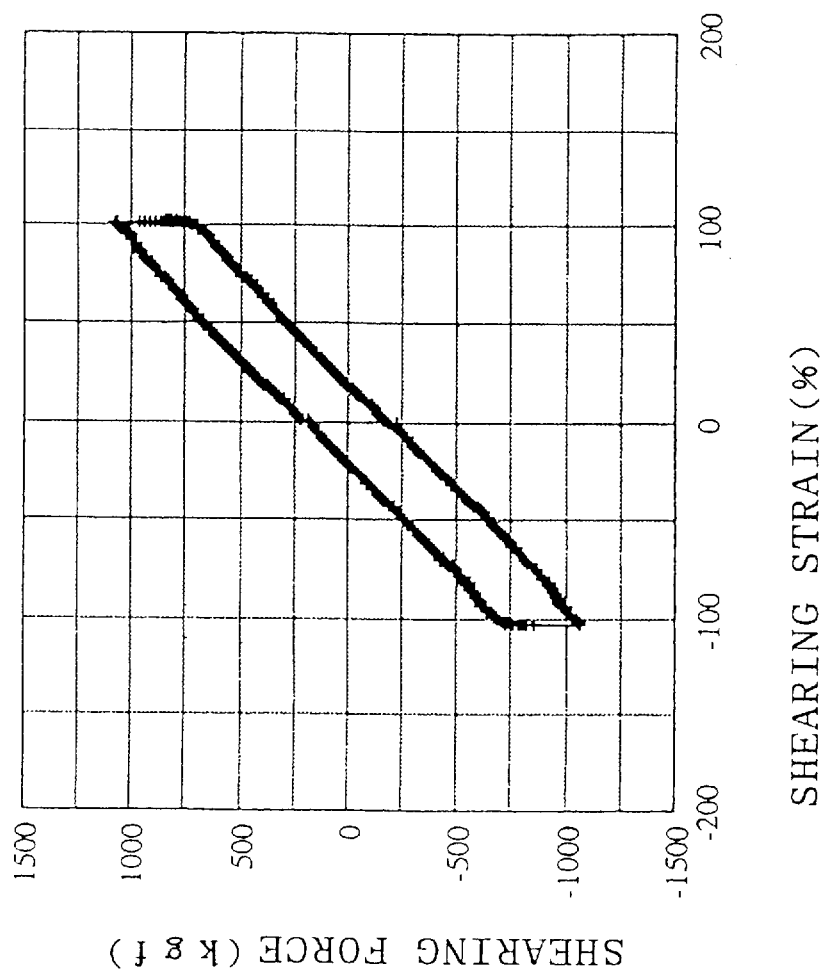
FIG. 4 is a graph showing a hysteresis loop of the seismic isolation apparatus of Example 1.

FIG. 4 is a graph showing the hysteresis loop of the seismic isolation apparatus of Example 1.

The hysteresis loop was measured under the following condition:

The condition of the measurement:
 a load of 10 tonf; and
 100% shearing strain by a sinusoidal wave of a frequency of 0.2 Hz.

Figure 5:
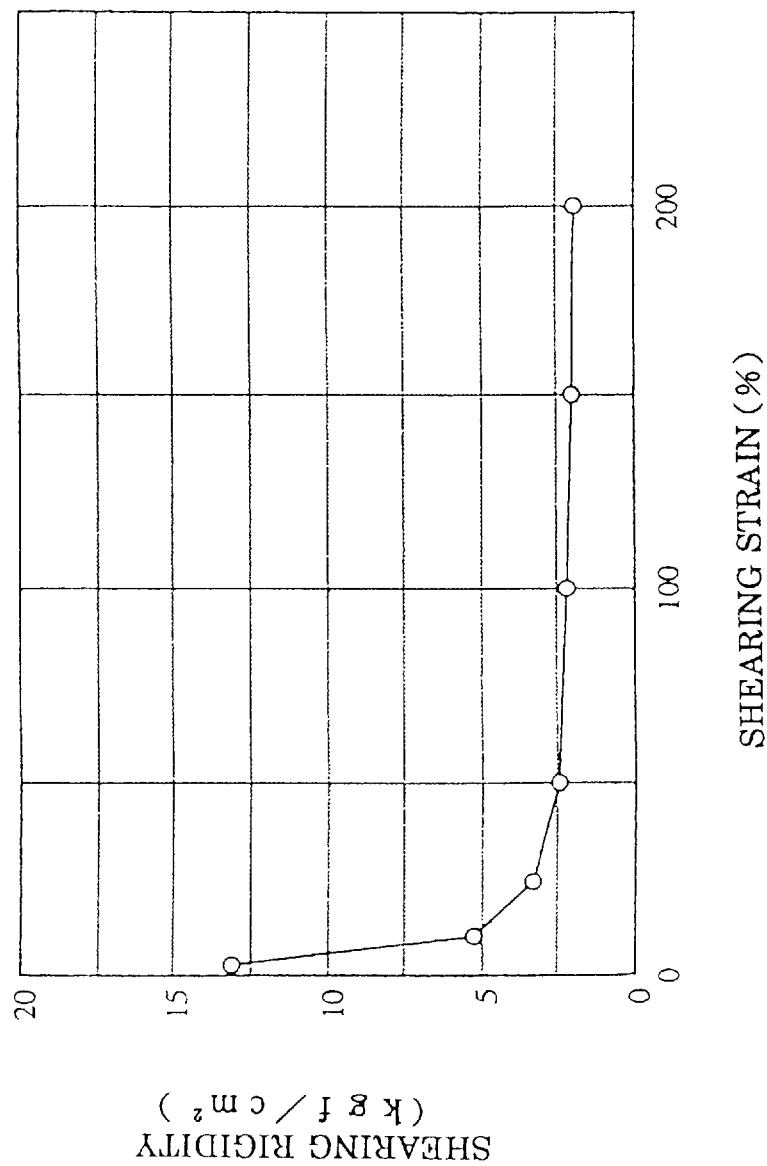
FIG. 5 is a graph showing the relation between shearing rigidity and shearing strain of the seismic isolation apparatus of Example 1.

FIG. 5 is a graph showing the relation of shearing rigidity and shearing strain when the laminate of friction plates having a diameter of 35 mmø was confined. The results on various properties of the seismic isolation apparatus of Example 1 obtained from these measurements are as follows:

(1) the proper vibration when the shearing strain is relaxed by 10% from 100% strain to 90% strain: 1.14 Hz ($\geq 0.9$ Hz);

(2) the proper vibration at a shearing strain of 100%: 0.59 Hz; and (3) the proper vibration at a displacement of 2 mm (a shearing strain of 2.56%): 1.43 Hz.

It was confirmed that the seismic isolation apparatus of Example 1 satisfied all the requirements of the present invention, and the excellent properties could be obtained for isolation of the various types of vibration.

EXAMPLE 2

A composite multilayered member was constituted with 30 sheets of a hard plate (an inner steel plate) (outer diameter, 250 mmø; inner diameter, 50 mmø; and thickness, 1.6 mm) and 31 sheets of a soft plate (a rubber having a 50% modulus of 2.7 kgf/cm$^2$, a tensile strength of 90 kgf/cm$^2$, and an elongation at break of 760% being used; thickness, 2.5 mm; the same top shape as that of the hard plate) (the total thickness of the rubber, 78 mm). Into the cavity of the composite multilayered member, a laminate of 97 sheets of a friction plate [a nylon plate (6,6-nylon) having an outer diameter of 50 mmø and a thickness of 1.5 mm] was packed. The peripheral surface of the composite multilayered member was covered with a cover rubber, and a flange was fabricated in the same manner as that conducted in Example 1.

A steel plate having an outer diameter of 50 mm and a thickness of 5 mm was disposed on top of the laminate of the friction plates. The laminate of the friction plates was pressed with a bolt of M30 through the fixing flange threaded in M30 with a clamping torque of 400 kgf-cm to confine the laminate of the friction plates in the cavity. The clamping pressure was 50 kgf/cm$^2$.

Figure 6:
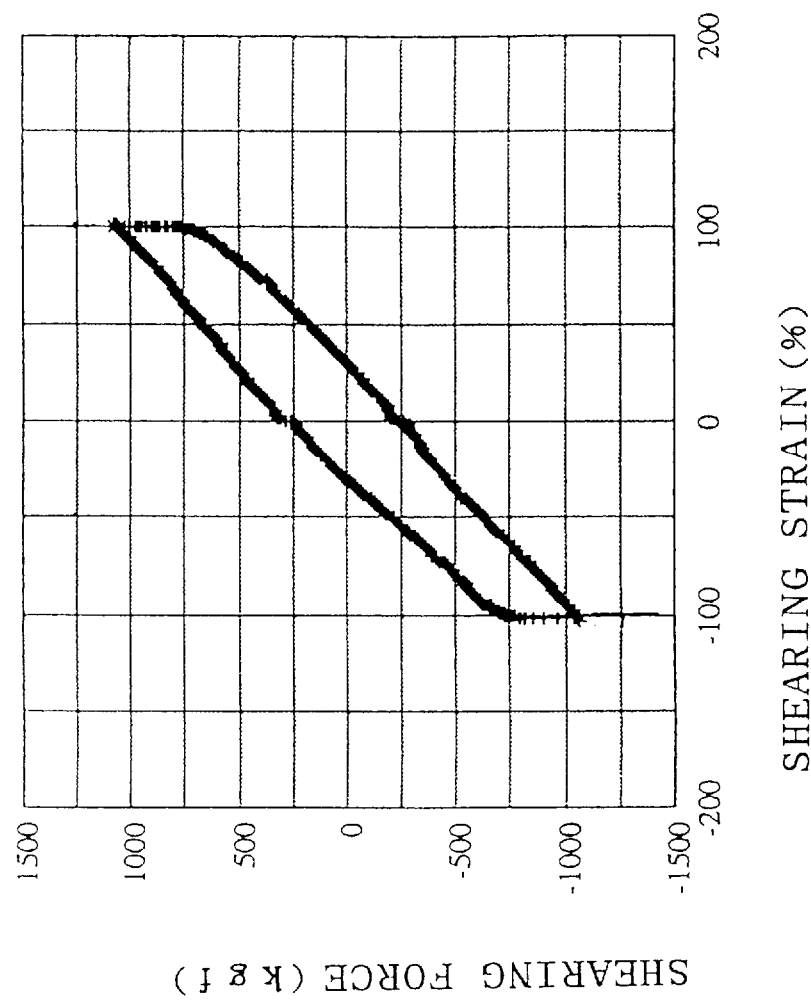
FIG. 6 is a graph showing a hysteresis loop of the seismic isolation apparatus of Example 2.

FIG. 6 is a graph showing the hysteresis loop of the seismic isolation apparatus of Example 2.

The hysteresis loop was measured under the following condition:

The condition of the measurement:
 a load of 10 tonf; and
 100% shearing strain by a sinusoidal wave of a frequency of 0.2 Hz.

Figure 7:
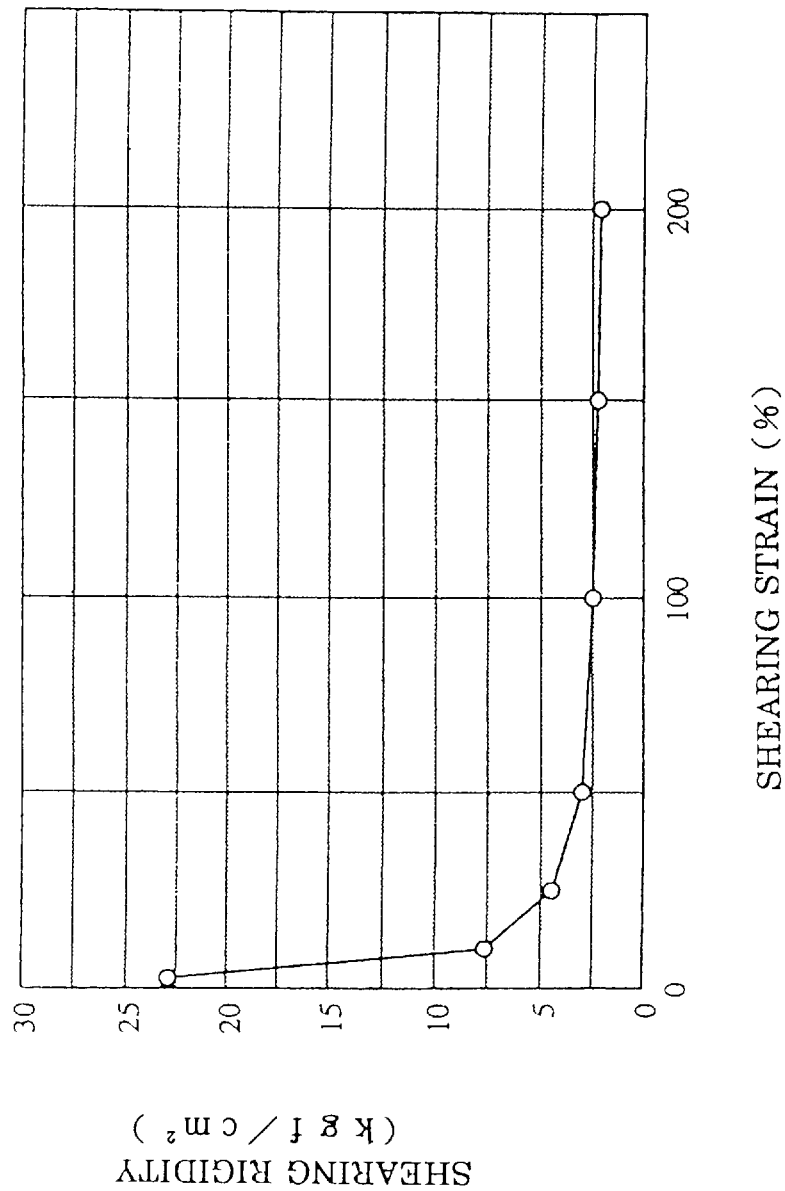
FIG. 7 is a graph showing the relation between shearing rigidity and shearing strain of the seismic isolation apparatus of Example 2.

FIG. 7 is a graph showing the relation of shearing rigidity and shearing strain when the laminate of friction plates having a diameter of 50 mmø was confined. The results on various properties of the seismic isolation apparatus of Example 2 obtained from these measurements are as follows:

(1) the proper vibration when the shearing strain is relaxed by 10% from 100% strain to 90% strain: 1.48 Hz ($\geq 0.9$ Hz);

(2) the proper vibration at a shearing strain of 100%: 0.59 Hz; and (3) the proper vibration at a displacement of 2 mm (a shearing strain of 2.56%): 1.89 Hz.

It was confirmed that the seismic isolation apparatus of Example 2 satisfied all the requirements of the present invention, and the excellent properties could be obtained for isolation of the various types of vibration.

EXAMPLE 3

A composite multilayered member was constituted with 30 sheets of a hard plate (an inner steel plate) (outer diameter, 250 mmø; inner diameter, 100 mmø; and thickness, 1.6 mm) and 31 sheets of a soft plate (a rubber having a 50% modulus of 2.7 kgf/cm$^2$, a tensile strength of 90 kgf/cm$^2$, and an elongation at break of 760% being used; thickness, 2.5 mm; the same top shape as that of the hard plate) (the total thickness of the rubber, 78 mm). Into the cavity of the composite multilayered member, a laminate of 97 sheets of a friction plate [a nylon plate (6,6-nylon) having an outer diameter of 100 mmø and a thickness of 1.5 mm] was packed. The peripheral surface of the composite multilayered member was covered with a cover rubber in the same manner as that conducted in Example 1.

The center of a fixing flange disposed at one side of the composite multilayered member 12 was threaded in M44. A steel plate having an outer diameter of 100 mm and a thickness of 5 mm was disposed on top of the laminate of the friction plates. The laminate of the friction plates was pressed with a bolt of M44 through the fixing flange threaded in M44 with a clamping torque of 600 kgf-cm to confine the laminate of the friction plates in the cavity. The clamping pressure was 8 kgf/cm$^2$.

Figure 8:
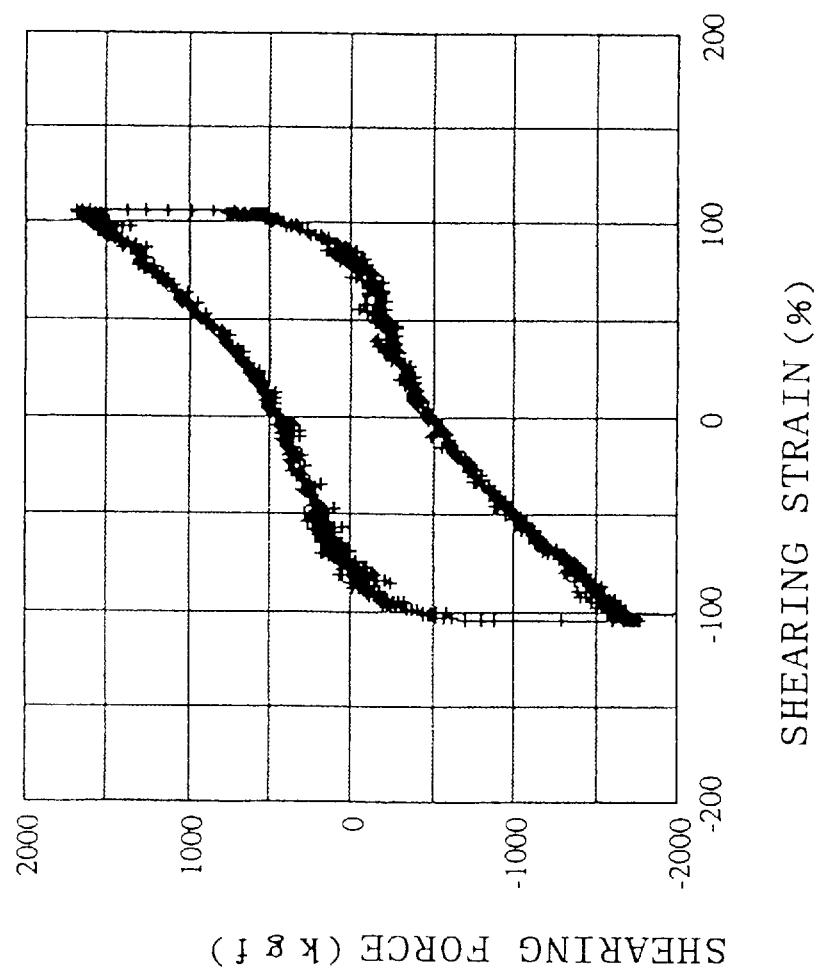
FIG. 8 is a graph showing a hysteresis loop of the seismic isolation apparatus of Example 3.

FIG. 8 is a graph showing the hysteresis loop of the seismic isolation apparatus of Example 3.

The hysteresis loop was measured under the same condition as that in Example 1.

Figure 9:
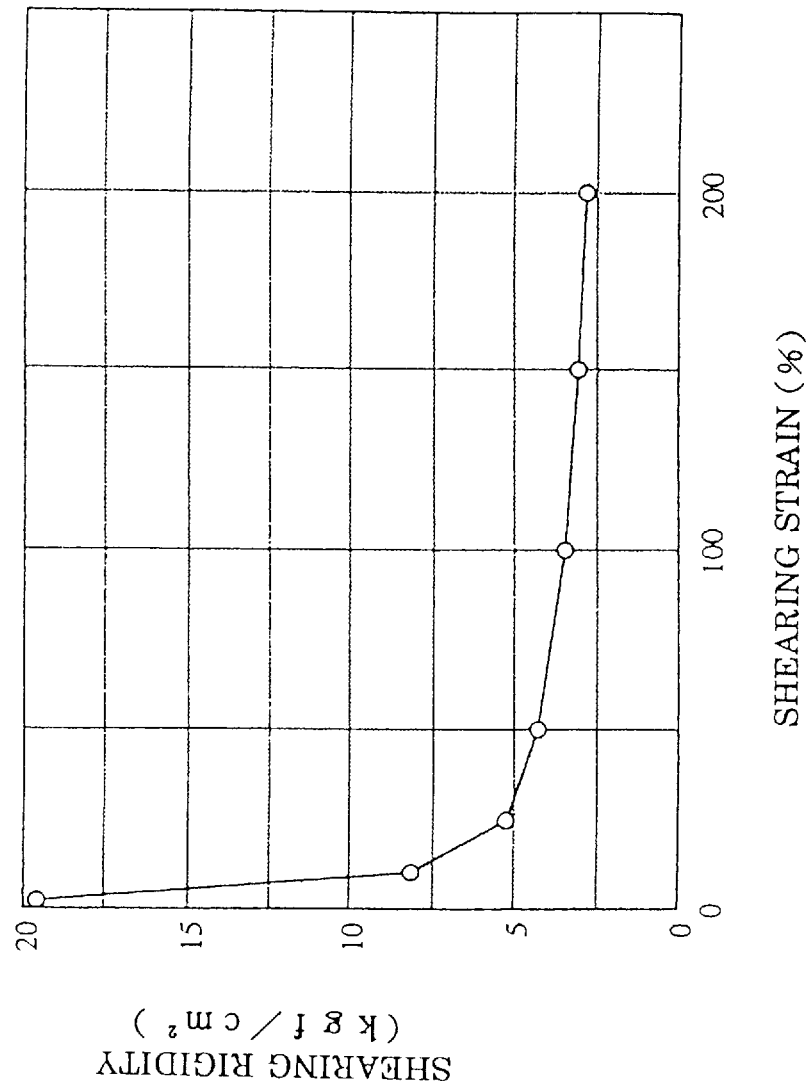
FIG. 9 is a graph showing the relation between shearing rigidity and shearing strain of the seismic isolation apparatus of Example 3.

FIG. 9 is a graph showing the relation of shearing rigidity and shearing strain when the laminate of friction plates having a diameter of 100 mmø was confined. The results on various properties of the seismic isolation apparatus of Example 3 obtained from these measurements are as follows:

(1) the proper vibration when the shearing strain is relaxed by 10% from 100% strain to 90% strain: 2.11 Hz ($\geq 0.9$ Hz);

(2) the proper vibration at a shearing strain of 100%: 0.74 Hz; and (3) the proper vibration at a displacement of 2 mm (a shearing strain of 2.56%): 1.75 Hz.

It was confirmed that the seismic isolation apparatus of Example 3 satisfied all the requirements of the present invention, and the excellent properties could be obtained for isolation of the various types of vibration.

Comparative Example 1

A composite multilayered member was prepared by alternately laminating 30 sheets of a hard plate (an inner steel plate) (outer diameter, 250 mmø; and thickness, 1.6 mm) having no cavity and 31 sheets of a soft plate (a rubber having a 50% modulus of 2.7 kgf/cm$^2$, a tensile strength of 90 kgf/cm$^2$, and an elongation at break of 760% being used; thickness, 2.5 mm; the same top shape as that of the hard plate) (the total thickness of the rubber, 78 mm). The peripheral surface of the composite multilayered member was covered with a cover rubber in the same manner as that conducted in Example 1.

Figure 10:
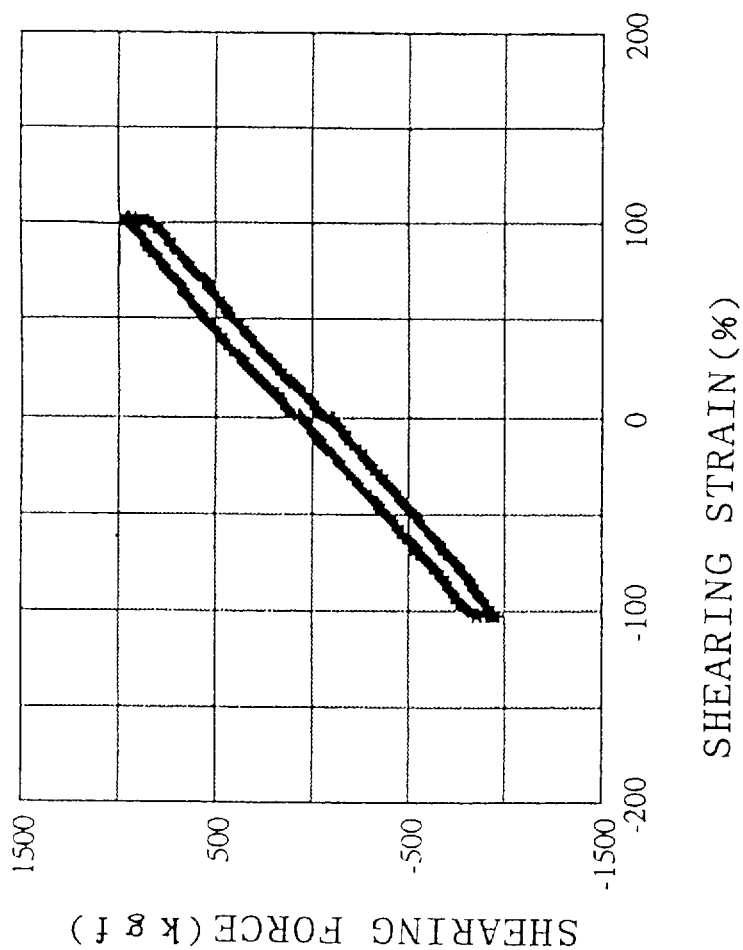
FIG. 10 is a graph showing a hysteresis loop of the seismic isolation apparatus of Comparative Example.

FIG. 10 is a graph showing the hysteresis loop of the seismic isolation apparatus of Comparative Example 1.

The hysteresis loop was measured under the same condition as that in Example 1.

Figure 11:
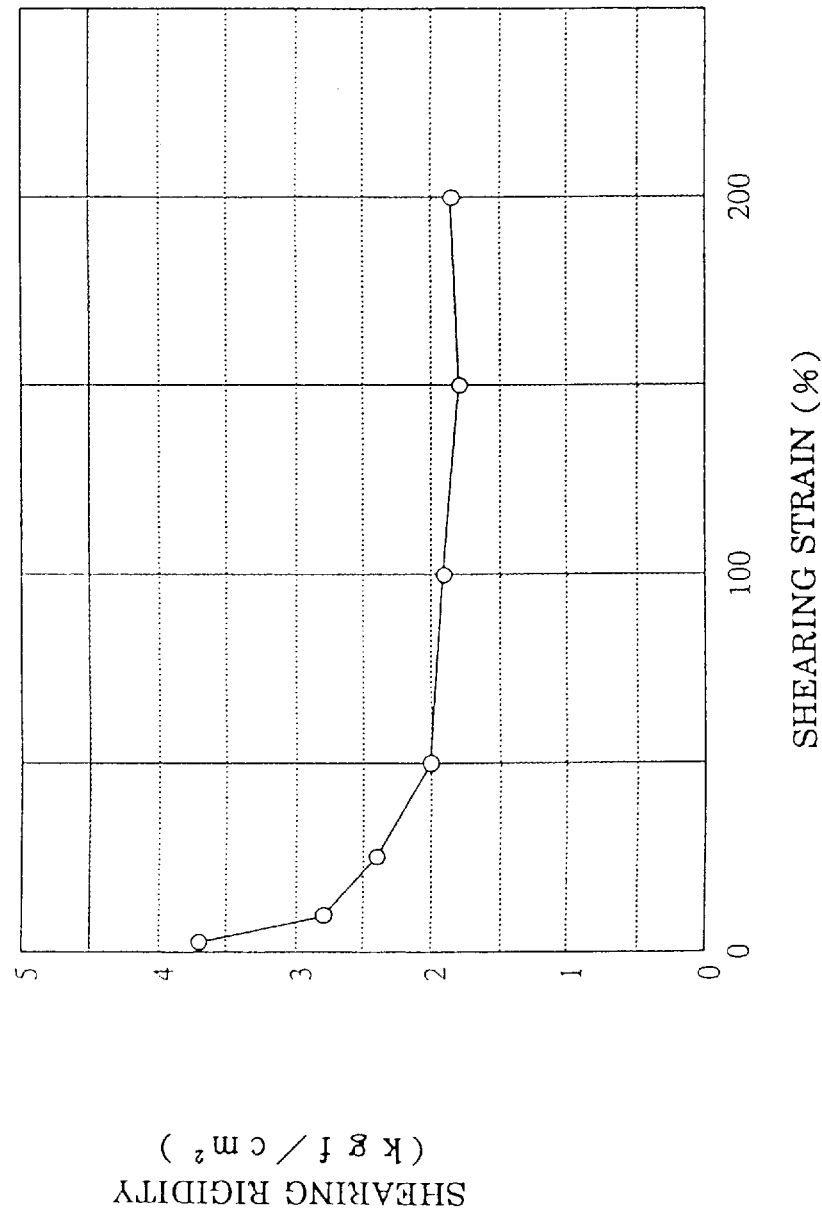
FIG. 11 is a graph showing the relation between shearing rigidity and shearing strain of the seismic isolation apparatus of Comparative Example.

FIG. 11 is a graph showing the relation of shearing rigidity and shearing strain when no friction plate was confined. The results on various properties of the seismic isolation apparatus of Comparative Example 1 obtained from these measurements are as follows:

(1) the proper vibration when the shearing strain is relaxed by 10% from 100% strain to 90% strain: 0.8 Hz (<0.9 Hz);

(2) the proper vibration at a shearing strain of 100%: 0.55 Hz; and (3) the proper vibration at a displacement of 2 mm (a shearing strain of 2.56%): 0.76 Hz.

It was found that the seismic isolation apparatus of Comparative Example 1 did not show the desired effect on prevention of shake by wind although the desired effects were found on isolation of the traffic vibration and the seismic isolation, and the desired properties for isolation of the various types of vibration could not be obtained.

EXAMPLE 4

FIG. 2 shows a schematic cross-sectional view of the seismic isolation apparatus 26 of Example 4 of the present invention.

A composite multilayered member 12 was prepared by alternately laminating 30 sheets of a hard plate 14 (an inner steel plate) (outer diameter, 250 mmø; inner diameter, 46 mmø; and thickness, 1.6 mm) and 31 sheets of a soft plate 16 (a rubber having a 50% modulus of 2.7 kgf/cm$^2$, a tensile strength of 90 kgf/cm$^2$, and an elongation at break of 760% being used; thickness, 2.5 mm; the same top shape as that of the hard plate) (the total thickness of the rubber, 78 mm). Into the cavity of the composite multilayered member 12, a rod of lead 28 (outer diameter, 46 mmø; height, 148 mm; purity of lead, 99.99%) was packed, and 97 sheets of a protective ring 30 [a nylon plate (6,6-nylon) having an outer diameter of 46 mmø, an inner diameter of 20 mmø, and a thickness of 1.5 mm] were laminated around the rod of lead. The peripheral surface of the composite multilayered member 12 was covered with a cover rubber 18 in the same manner as that conducted in Example 1. The rod of lead 28 was pressed into the cavity by a pressure of about 0.7 Tonf/cm$^2$. A steel plate 31 having an outer diameter of 46 mm and a thickness of 5 mm (a holding plate) was disposed at a recess formed at the center of a flange 22 which is on top of the rod of lead 28 and the laminate of the protective rings 30. A steel plate 23 having a thread of M30 was disposed at the recess formed at the center of the flange 22 and fixed by using bolts. A pressure plate 31 was fixed by pressing a pressing bolt 29 of M30 from this steel plate 23 with a clamping torque of 400 kgf-cm. The clamping pressure at this time was 50 kgf/cm$^2$.

As described above, when a thread is not formed in the flange 22 but a threaded steel plate 23 is separately prepared and fixed to the flange 22, a pressing bolt 29 which is threaded in a desired diameter can easily be applied to a single flange 22 by preparing the steel plate 23 having a thread in the desired diameter.

Figure 12:
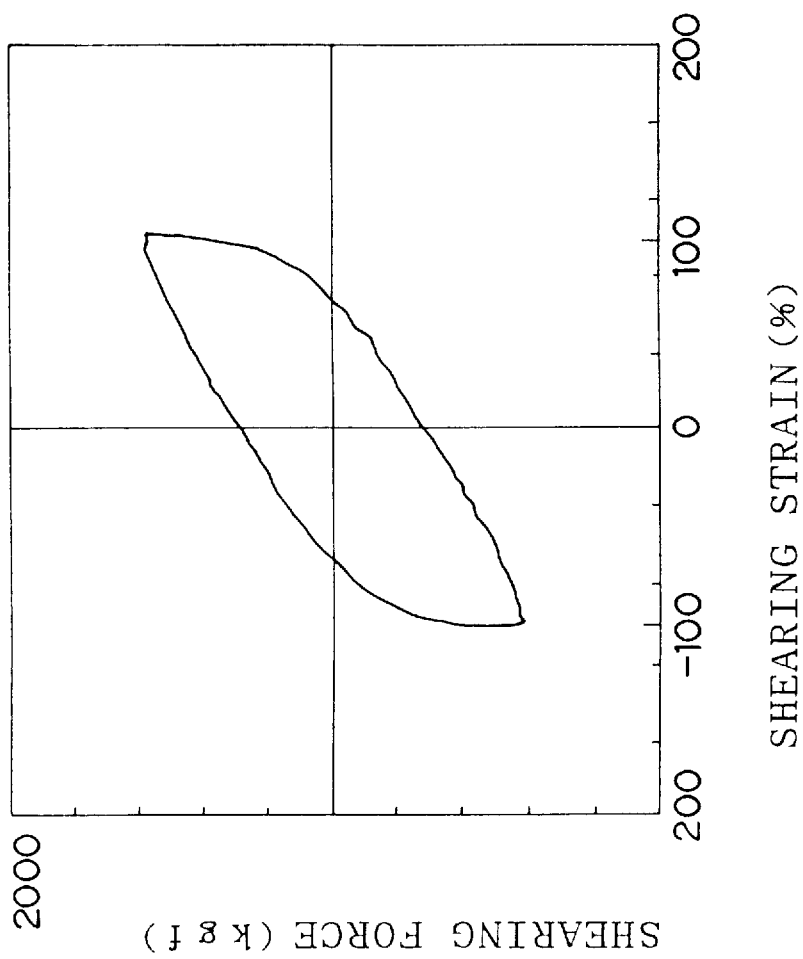
FIG. 12 is a graph showing a hysteresis loop of the seismic isolation apparatus of Example 4.

FIG. 12 is a graph showing the hysteresis loop of the seismic isolation apparatus of Example 4.

The hysteresis loop was measured under the same condition as that in Example 1.

FIG. 13 is a graph showing the relation of shearing rigidity and shearing strain when the rod of lead (20ø) and the protective plates (46 mmø/20 mmø) were confined. The results on various properties of the seismic isolation apparatus of Example 4 obtained from these measurements are as follows:

(1) the proper vibration when the shearing strain is relaxed by 10% from 100% strain to 90% strain: 1.56 Hz ($\geq$0.9 Hz);

(2) the proper vibration at a shearing strain of 100%: 0.64 Hz; and (3) the proper vibration at a displacement of 2 mm (a shearing strain of 2.56%): 1.58 Hz.

It was confirmed that the seismic isolation apparatus of Example 4 satisfied all the requirements of the present invention, and the excellent properties could be obtained for isolation of the various types of vibration.

EXAMPLE 5

FIG. 3 shows a schematic sectional view of the seismic isolation apparatus 32 of Example 5 of the present invention.

A composite multilayered member 12 was prepared by alternately laminating 30 sheets of a hard plate 14 (an inner steel plate) (outer diameter, 250 mmø; inner diameter, 50 mmø; and thickness, 1.6 mm) and 31 sheets of a soft plate 16 (a rubber having a 50% modulus of 2.7 kgf/cm$^2$, a tensile strength of 90 kgf/cm$^2$, and an elongation at break of 760% being used; thickness, 2.5 mm; the same top shape as that of the hard plate) (the total thickness of the rubber, 78 mm). Into the cavity of the composite multilayered member 12, glass beads 34 having a diameter of 0.1 mm as the hard granular material were packed. The peripheral surface of the composite multilayered member 12 was covered with a cover rubber 18 in the same manner as that conducted in Example 1. The center of a fixing flange 22 disposed at one side of the composite multilayered member 12 was threaded in M30. The glass beads 34 were pressed by tapping into the cavity at the center of the composite multilayered member 12. A steel plate 35 having an outer diameter of 50 mm and a thickness of 5 mm was disposed on top of the glass beads 34. The glass beads 34 were pressed with a bolt (a cap) 36 of M30 through the fixing flange threaded in M30 with a clamping torque of 400 kgf-cm. The clamping pressure force was 50 kgf/cm$^2$.

FIG. 14 is a graph showing the hysteresis loop of the seismic isolation apparatus of Example 5.

The hysteresis loop was measured under the same condition as that in Example 1.

FIG. 15 is a graph showing the relation of shearing rigidity and shearing strain when the glass beads were packed by tapping. The results on various properties of the seismic isolation apparatus of Example 5 obtained from these measurements are as follows:

(1) the proper vibration when the shearing strain is relaxed by 10% from 100% strain to 90% strain: 1.49 Hz ($\geq$0.9 Hz);

(2) the proper vibration at a shearing strain of 100%: 0.68 Hz; and (3) the proper vibration at a displacement of 2 mm (a shearing strain of 2.56%): 1.8 Hz.

It was confirmed that the seismic isolation apparatus of Example 5 satisfied all the requirements of the present invention, and the excellent properties could be obtained for isolation of the various types of vibration.

The results obtained in Examples and Comparative Example 1 are summarized in Table 1.

TABLE 1

| | claimed range | Ex.1 | Ex.2 | Ex.3 | Ex.4 | Ex.5 | Comp. Ex. 1 |
|---|---|---|---|---|---|---|---|
| prop. vib. at 10% return in hysteresis loop | $f_H \geq 0.9$ Hz | 11.4 | 1.48 | 2.11 | 1.56 | 1.49 | 0.8 |
| prop. vib. at 100% horizontal strain | $0.1$ Hz $\leq f_H \leq 0.8$ Hz | 0.59 | 0.59 | 0.74 | 0.64 | 0.68 | 0.55 |

TABLE 1-continued

|  | claimed range | Ex.1 | Ex.2 | Ex.3 | Ex.4 | Ex.5 | Comp. Ex. 1 |
|---|---|---|---|---|---|---|---|
| prop. vib. at 2 mm or less horizontal displacement | 0.1 Hz ≦ f$_H$ ≦ 2 Hz | 1.43 | 1.89 | 1.75 | 1.58 | 1.80 | 0.76 |

Abbreviations in the table:
Ex.: Example
Comp. Ex.: Comparative Example
prop. vib.: proper vibration As can clearly be understood from Table 1, the seismic isolation apparatus of Examples which satisfied the requirements of the present invention all exhibited satisfactory properties with respect to all of the three types of vibration isolation, i.e. seismic isolation, prevention of shake by wind, and isolation of traffic vibration. In contrast, the seismic isolation apparatus of Comparative Example did not show the desired effect on prevention of shake by wind although the desired effects were found on isolation of the traffic vibration and the seismic isolation, and the desired properties for isolation of the various types of vibration could not be obtained.

EXAMPLE 6

FIG. 16 shows a sectional view of a seismic isolation apparatus 33 of Example 6 of the present invention. In the seismic isolation apparatus shown in FIG. 16, between an upper flange 22 (a steel plate) and a lower flange (a steel plate), 20 sheets of a steel plate having an outer diameter of 160 mm, an inner diameter of 30 mm, and a thickness of 1 mm were used as the hard plates 14, and 21 layers of a soft plate 16 (thickness of a single plate, 1.57 mm) made of a rubber material having a 50% modulus of 1.9 kgf/cm$^2$, a tensile strength of 70 kgf/cm$^2$, and an elongation at break of 700% were used. Into a bag made of cotton 25 (diameter, 30 mm; and depth, 63 mm) which had been made ready for use in advance, glass beads 34 having a diameter of 1 mm (a spherical shape) were packed in the possible maximum amount while being tapped. The bag of cotton 25 has a shape in which the side parts having a cylindrical shape and the bottom part having a circular shape were sewed together to form an integrated single bag. The bag 25 packed with the glass beads 34 (a spherical shape) was inserted into a cavity formed at the central part of a composite multilayered member of the seismic isolation apparatus 33. The glass beads were packed into the cavity and confined there in a compressed condition by screwing a cap 36 with a thread in M30 and disposed on top of the glass beads with a torque of 1 kgm. The peripheral parts of the composite multilayered member was covered with a cover rubber 18 made of a rubber material using natural rubber. Thus, the seismic isolation apparatus of Example 6 was obtained.

The shearing rigidity (G) and tan d were measured while vibration was applied to the seismic isolation apparatus 33 under a load of 3 t and with a shearing strain of 100% under a frequency f=0.2 Hz. The results are shown in Table 2.

Reference Example and Comparative Example 2

In Reference Example, a seismic isolation apparatus was prepared by the same procedures as those described above except that the glass beads 34 alone were packed without disposing a bag 22 in the cavity of the composite multilayered member. The obtained seismic isolation apparatus was evaluated in accordance with the same methods as those described above. In Comparative Example 2, a seismic isolation apparatus was prepared by the same procedures as those described above except that the glass beads 34 packed into the bag 22 were not disposed in the cavity of the composite multilayered member. The obtained seismic isolation apparatus was evaluated in accordance with the same methods as those described above. The results are shown in Table 2.

TABLE 2

|  | Example 6 | Reference Example | Comparative Example 2 |
|---|---|---|---|
| shearing rigidity (G) (kgf/cm2) | 2.7 | 2.5 | 1.6 |
| tan δ | 0.39 | 0.37 | 0.1 |

As can be clearly understood from Table 2, the seismic isolation apparatus of Example 6 of the present invention showed a remarkably increased damping effect in comparison with the seismic isolation apparatus of Comparative Example which has no glass beads in the cavity. Moreover, glass beads were prevented from being buried into the soft plates because the glass beads were confined into the bag, and a larger friction force was achieved. Thus, it was confirmed that the seismic isolation effect of the seismic isolation apparatus of the present invention is enhanced in comparison with that of the seismic isolation apparatus of Reference Example in which the glass beads were arranged without disposing the bag.

It was also confirmed from those results that the values of a shearing rigidity G of 2.7 kgf/cm$^2$ and a tan (δ of 0.39 were at a sufficient level for use as a seismic isolation structure for single family houses.

The seismic isolation apparatus of the present invention exhibits the advantage that the seismic isolation apparatus has the function of seismic isolation, prevention of shake by wind, and isolation of traffic vibration and is advantageously used for constructions having a light weight, such as single family houses because the seismic isolation apparatus has the structure described above.

What is claimed is:

1. A seismic isolation apparatus having a composite multilayered member, comprising:
   a plurality of hard plates having rigidity and a plurality of soft plates having viscoelastic property which are arranged to form alternating layers between an upper flange and a lower flange,
   a cavity disposed through the composite multilayered member from an upper end to a lower end thereof, wherein the cavity is packed with a granular material;
   wherein said apparatus satisfies the condition that proper vibration in the horizontal direction of the seismic isolation apparatus is represented by f$_H$ and obtained by the following equation:

$$f_H = \frac{1}{2P} \sqrt{K_H/M}$$

wherein K$_H$ represents a spring constant of the seismic isolation apparatus to the horizontal direction, M represents mass of a structure mounted on the seismic isolation apparatus, and f$_H$ has a value in the range of:
   0.1 Hz≦f$_H$≦2 Hz when the displacement of the seismic isolation apparatus in the horizontal direction is 2 mm or less, 0.1 Hz≦$f_H$≦0.8 Hz when amplitude of input vibration in the horizontal direction is equal to 100% shearing strain and 0.9 Hz≦$f_H$ when deformation in terms of shearing strain is relaxed by 10% from the maximum deformation in measurement of a hysteresis loop of the seismic isolation apparatus.

2. A seismic isolation apparatus according to claim 1, wherein a relation between a diameter of the hard plates represented by D and a diameter of the cavity represented by d is expressed by the following formula:

$$0.05 \leq (d/D) \leq 0.8.$$

3. A seismic isolation apparatus according to claim 1, wherein the granular material has an average grain diameter of from 0.01 to 30 mm.

4. A seismic isolation apparatus according to claim 1, wherein the granular material is pressed into the cavity disposed through the composite multilayered member from the upper end to the lower end thereof by a pressing force of 5 to 150 kgf/cm² and confined in the cavity.

5. A seismic isolation apparatus according to claim 1, wherein the granular material is packed into a bag made of at least one material selected from the group consisting of rubber, synthetic resins and sheets of fiber and placed in the cavity disposed through the composite multilayered member from the upper end to the lower end thereof.

6. A seismic isolation apparatus according to claim 5, wherein the granular material packed into the bag is pressed into the cavity disposed through the composite multilayered member from the upper end to the lower end thereof by a pressing force of 5 to 150 kgf/cm² and confined in the cavity.

7. A seismic isolation apparatus according to claim 5, wherein the sheets of fiber for the bag are selected from the group consisting of woven fabrics, knitted fabrics and non-woven fabrics.

* * * * *